(12) United States Patent
Holzmueller et al.

(10) Patent No.: US 7,935,890 B2
(45) Date of Patent: May 3, 2011

(54) GAS BLOCKING, HIGH TEMPERATURE CONDUCTOR-INSULATION ADHESIVE

(75) Inventors: Jason Holzmueller, Lawrence, KS (US);
Mark A. Metzger, Lawrence, KS (US);
Gregory H. Manke, Lawrence, KS (US)

(73) Assignee: Schlumberger Technology Corporation, Sugar Land, TX (US)

( * ) Notice: Subject to any disclaimer, the term of this patent is extended or adjusted under 35 U.S.C. 154(b) by 74 days.

(21) Appl. No.: 12/345,228

(22) Filed: Dec. 29, 2008

(65) Prior Publication Data

US 2010/0163271 A1    Jul. 1, 2010

(51) Int. Cl.
*H01B 7/00* (2006.01)
(52) U.S. Cl. .................................................. 174/110 R
(58) Field of Classification Search ............... 174/110 R, 174/110 SR
See application file for complete search history.

(56) References Cited

U.S. PATENT DOCUMENTS

| | | | |
|---|---|---|---|
| 3,236,917 A * | 2/1966 | Borsini et al. | 525/260 |
| 4,134,927 A * | 1/1979 | Tomoshige et al. | 525/245 |
| 5,556,697 A | 9/1996 | Flenniken | |
| 6,299,978 B1 | 10/2001 | Sarma | |
| 6,402,993 B1 | 6/2002 | Easter | |
| 6,525,119 B2 | 2/2003 | Tsukada et al. | |
| 6,596,393 B1 * | 7/2003 | Houston et al. | 428/389 |
| 6,673,448 B2 | 1/2004 | Gustafsson et al. | |
| 6,706,791 B2 | 3/2004 | Tsukada et al. | |
| 6,972,099 B2 | 12/2005 | Easter | |

\* cited by examiner

*Primary Examiner* — Chau N Nguyen
(74) *Attorney, Agent, or Firm* — Kevin B. McGoff; Rodney V. Warfford (57) ABSTRACT

An adhesive composition includes 100 parts by weight of a polyolefin polymer derived from an olefin monomer copolymerized with at least one co-monomer that is different form the olefin monomer; 1~100 parts by weight of an adhesion promoting agent comprising a polybutadiene polymer, which has a molecular weight of 1,000~10,000 and has an anhydride group grafted thereon; 0.1~5 parts by weight of an antioxidant; and 0.5~15 parts by weight of a curative agent. An adhesive composition includes 100 parts by weight of a polyolefin polymer derived from an olefin monomer copolymerized with at least one co-monomer that is different form the olefin monomer, where in the polyolefin polymer comprises an anhydride group grafted thereon; 0.1~5 parts by weight of an antioxidant; and 0.5~15 parts by weight of a curative agent.

18 Claims, 5 Drawing Sheets

GAS BLOCKING, HIGH TEMPERATURE CONDUCTOR-INSULATION ADHESIVE

BACKGROUND

1. Technical Field

The present application relates to conductor cables, such as those used with equipment for the production of hydrocarbons from subsurface reservoirs.

2. Background Art

Electric submersible pump (ESP) are used in many industries for pumping liquids, such as oil, water, brines, or a combination thereof. For example, in oilfield applications, ESPs may be used to pump fluids (such as hydrocarbons or water) from the wells to the surface. An example of an ESP used in a well is illustrated in FIG. 1.

Figure 1:
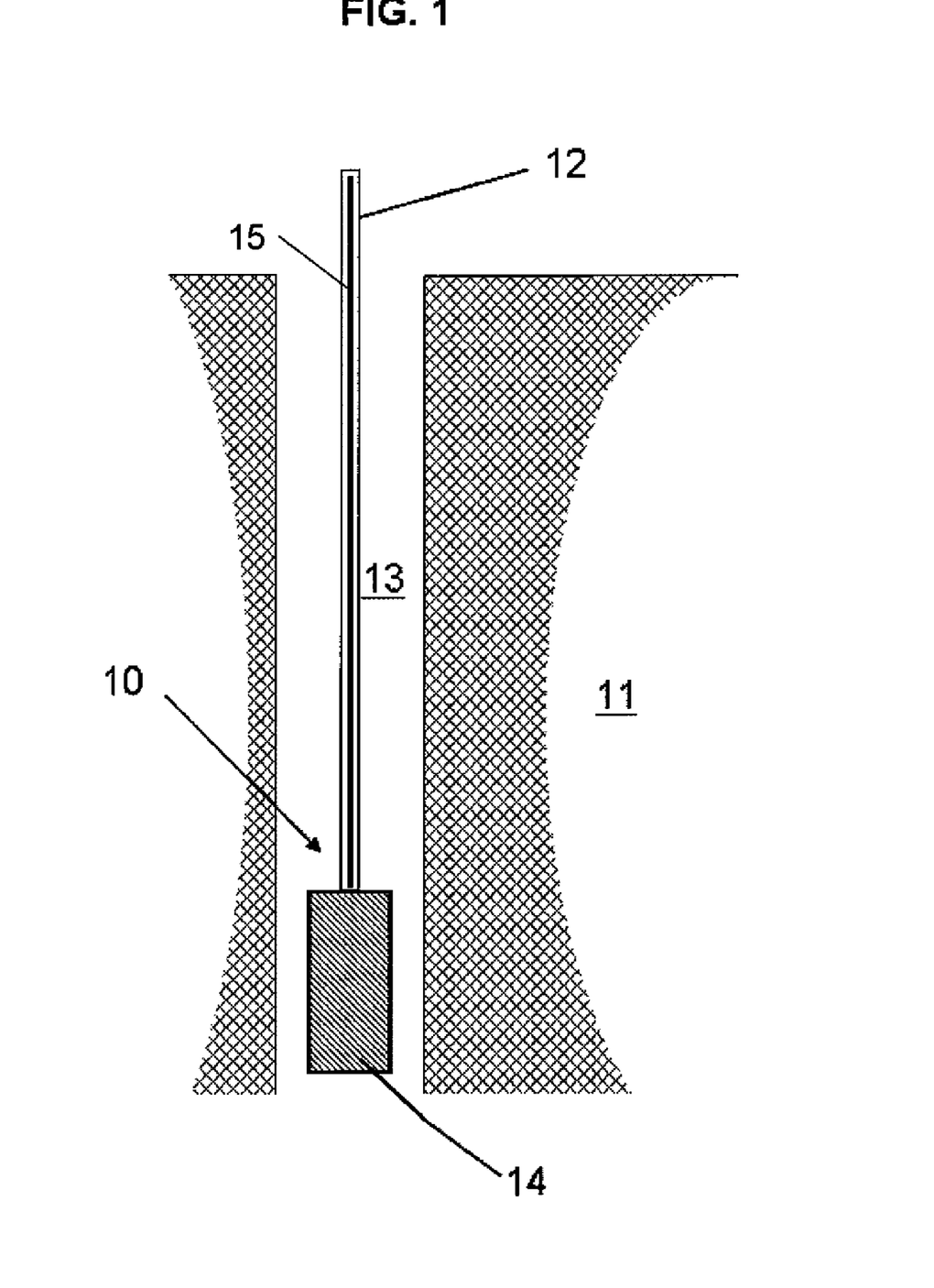
FIG. 1 shows a conventional oilfield set up, illustrating a downhole tool, which may include an ESP, disposed in a wellbore.

As shown in FIG. 1, a downhole assembly 10 is disposed in a well 13 penetrating a formation 11. The downhole assembly 10 is lowered in the well 13 via a wireline, tubing, or cable 12. The downhole assembly 10 may include an electric submersible pump (ESP) 14. In this case, the wireline/cable 12 may include an ESP power cable 15. Power transmission from the surface to the downhole ESP 14 is accomplished by the ESP power cable 15. The ESP power cable 15 is specifically designed for downhole oilfield applications.

ESP cables typically transmit between 500V and 20 kV at a wide range of amperages. ESP cable design should take into account the effects of extreme downhole environments, including high temperature (200° C. or higher) and high pressure (25,000 psi or higher). In addition, the downhole wells typically contain various fluids and gases, such as hydrocarbons, water, brines, hydrogen sulfide ($H_2S$). Various well treatment chemicals and additives may also remain in the wells. Therefore, different wells may have different requirements for ESP cable designs, depending on the bottom hole temperature, the pressure, the water/oil ratio, and the aggressiveness and corrosiveness of the local formation fluids.

Figure 2:
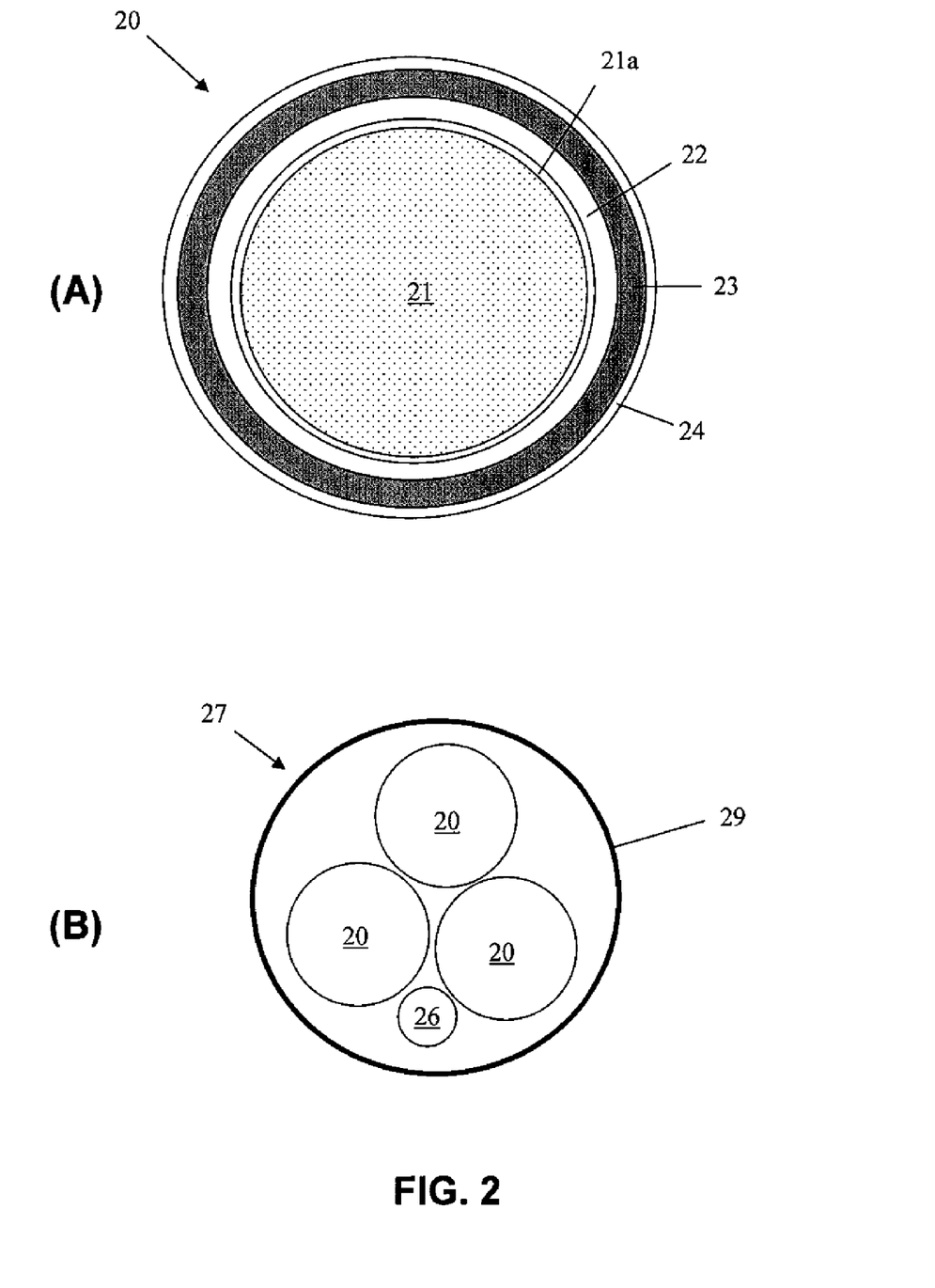
FIG. 2A shows a cross section of a conductor cable.
FIG. 2B shows a cross section of an assembly of a conductor cable.

FIG. 2A illustrates a cross section of an ESP cable design. An ESP cable may include one or more conductor cables. FIG. 2A show that a conductor cable 20 contains a conductor 21 (typically, copper conductors) and an insulation layer 23. The conductor 21 may be optionally coated with a metal alloy 21a to act as an $H_2S$ barrier. The insulation layer 23 is bonded to the conductor 21 by an adhesive layer 22. The adhesive 22 may be a solvent-based or water-based adhesive system. The insulation layer 23 can be made of a polymer, such as ethylene-propylene cross-linked polymers. The insulation layer 23 may be coated on the conductor 21 by extrusion methods. Depending on the well conditions that the cable is designed to encounter, the cable can be further coated with several jacketing or barrier layers 24. Examples of barrier layers 24 may include layers made of, for example, fluoropolymers (which may be applied as extrusion layers or tape wraps), lead, oil-resistant cross-linked nitrile rubber, or oil-resistant crosslinked ethylene-propylene diene rubber (EPDM).

Once individual ESP conductor cables 20 are made, one or more of these cables are finally wrapped with a metal armor, as illustrated in FIG. 21. The metal armor can be galvanized steel, stainless steel, Monel, or others. As shown in FIG. 2B, a finished ESP cable 27 may contain three ESP conductor cables 20 wrapped in a metal armor 29. However, custom configurations can allow for a greater (i.e., >3) or lesser (i.e., <3) number of conductor cables 20 to be included in a finished ESP cable 27. In addition, the finished ESP cable 27 may include capillary tubes, fiber optics, or additional signal or ground wires (shown as 26 in FIG. 2B).

Installation of ESPs and ESP cables in oil wells can require a great deal of specialized equipment. In addition, the installation can require that the well production be halted during the procedures. One skilled in the art would appreciate that any down time in well operations can be very costly. In some locations, particularly on offshore platforms, downtime in production can cost hundreds of thousands of dollars an hour. Therefore, ESP cable failures can be extremely expensive. Accordingly, it is often desired to optimize the cable designs and cable materials to eliminate or minimize ESP cable failures.

In many operations, ESP cables will be reused at least once, if not many times. Repeated installation and removal of the ESP cables can subject them to extreme thermal and pressure cyclings. Such repeated exposures to high-and-low temperatures and pressures may create micro-voids, typically at the interfaces between various layers. Any micro-voids thus formed on the ESP cable could expand when exposed to low pressure. As a result, any micro-void formation may eventually lead to ESP cable degradation and failure. For example, separation between the conductor (shown as 21 in FIG. 2A) and the insulation may lead to electrical discharge. In addition, any separation can provide a pathway for high pressure downhole gas to migrate up the conductor towards the low pressure region at the surface. When high-pressure gas reaches an area of low pressure, it will expand, causing void formation or damage to the insulation. Gas migration caused by this large pressure gradient can cause serious cable damage and lead to a compromised insulation layer and eventual cable failure.

As noted above, the insulation layers are typically coated over ESP cable conductors using water-based or solvent-based adhesives. Such adhesives typically contain 10-75% solids by weight. The liquid adhesive is wiped or sprayed on a conductor, and then it is dried rapidly (generally by hot air) to remove much of the solvent or water immediately prior to coating the insulation layer. The insulation layer is typically applied by feeding the adhesive-coated conductor through an extruder crosshead where a crosslinkable elastomer is applied over the conductor to form the insulation layer.

There are, however, several potential issues with the current approach to ESP cable manufacturing using liquid-based adhesive systems. As alluded to earlier, one issue relates to proper drying of the adhesive. Incomplete drying leaves excessive organic solvent or water trapped between the insulation layer and the conductor. Such trapped solvents or water may lead to void formation. Conversely, over-drying the adhesive may reduce its adhesiveness, leading to compromised bonding. Thus, micro-voids may form in an ESP cable manufactured with a liquid-based adhesive system, if the liquid-based adhesive is insufficiently or completely dried before extrusion of an insulation layer over the adhesive layer. Because the adhesive layer serves to form a strong bond between the surface of the conductor and the insulation layer, maintaining the integrity of this strong bond, therefore, is important to prevent micro-void formations between the conductor and the insulation.

Another issue with liquid-based adhesive systems is thermal stability and longevity of the adhesives. Typically, over long time and/or high temperatures, adhesive systems eventually degrade. As a result, ESP cables removed from high temperature wells often have little or no adhesion between the conductor and insulation due to thermal degradation of the adhesives. The lack of a strong bond between the insulation and conductor can allow corrosive gas to accumulate at the interface, leading to conductor corrosion. This not only decreases the conductivity of the conductor leading to higher conductor heating, but also allows for the ionization of charged gas particles at the interface. The charged gas ions can lead to corona discharge, which will cause damage to the insulation and can also lead to premature cable failure. Therefore, degradation of the adhesives can render these cables not reusable, although the other components of the cable might still be salvageable.

In addition, there are other potential processing, performance, and environmental issues with water-based or solvent-based adhesive systems. During ESP cable manufacturing, it is desirable to create an even and consistent coating and to dry the adhesive to a uniform tackiness. In addition, it is desirable to remove any excess solvent or water.

Performance concerns for the techniques can relate to the upper temperature limits of the adhesive systems. Systems usually begin to experience slow degradation above 150° C. (302° F.) and can degrade rapidly when subjected to downhole environments with temperatures exceeding 200° C. (392° F.).

Finally, environmental concerns relates to evaporation of volatile organic compounds (VOC) from solvent-based adhesive systems. The solvents used in these systems are often toxic. The amount of these toxic chemicals that can be released into the atmosphere is regulated by the Environmental Protection Agency (EPA). To prevent release of toxic solvents into the atmosphere, solvent vapor recovery systems can be used, but with added expense.

Power cables intended for the transmission of medium and high voltages often include a semi-conductive shield layer over the conductor wires. Such semi-conductor layers are often based on ethylene vinyl acetate acrylate (EVA). The use of EVA in such cables have been described in several patents, including U.S. Pat. No. 6,299,978 issued to Sarma et al.; U.S. Pat. Nos. 6,706,791 and 6,525,119 issued to Tsukada et al.; U.S. Pat. Nos. 6,972,099 and 6,402,993 issued to Easter et al.; and U.S. Pat. No. 6,673,448 issued to Gustafsson et al.

However, the EVA-based semi-conductive shield layers may degrade to generate acetic acid at high temperatures (greater than 150° C.). Formation of acetic acid may not be an issue for power cables operating around ambient temperatures. However, formation of acetic acid may be an issue for ESP cables, which may be exposed to temperatures up to 300° C. The formation of acidic compounds at the conductor/insulation interface can lead to corrosion of the conductors, and presence of polar species at the conductor shield/insulation interface may create an electrical stress concentration that can lead to electrical treeing and subsequent micro-void formation, partial discharge, and eventual cable failure.

U.S. Patent Publication No. 2000/5556697A (by Flenniken et al) discloses a semi-conductive power cable shield that uses EP(D)M and ethylene-alkene (EAM) polymers. These polymers provide effective, long-life alternatives to EVA in crosslinkable semiconductive shield applications. However, the compounds described in this patent lack any adhesive properties and would therefore not be acceptable for ESP cable use.

While water-based or solvent-based adhesive systems and EVA-based semi-conductive layer systems have proven useful under certain operating conditions, there remains a need for better adhesive systems that can maintain strong bonding between conductors and insulation in an electric cable, e.g., ESP cable, in extreme downhole environments.

SUMMARY

One aspect of the present application relates to adhesive compositions. An adhesive composition in accordance with one embodiment includes 100 parts by weight of a polyolefin polymer derived from an olefin monomer copolymerized with at least one co-monomer that is different form the olefin monomer; 1~100 parts by weight of an adhesion promoting agent comprising a polybutadiene polymer, which has a molecular weight of 1,000~10,000 and has an anhydride group grafted thereon; 0.1~5 parts by weight of an antioxidant; and 0.5~15 parts by weight of a curative agent.

An adhesive composition in accordance with one embodiment includes 100 parts by weight of a polyolefin polymer derived from an olefin monomer copolymerized with at least one co-monomer that is different form the olefin monomer, where in the polyolefin polymer comprises an anhydride group grafted thereon; 0.1~5 parts by weight of an antioxidant; and 0.5~15 parts by weight of a curative agent.

Another aspect relates to conductor cables. A conductor cable in accordance with one embodiment includes a conductor wire; an insulation layer; and an adhesive layer bonding the insulation layer to the conductor wire, wherein the adhesive layer is derived from an adhesive composition comprising: 100 parts by weight of a polyolefin polymer derived from an olefin monomer copolymerized with at least one co-monomer that is different form the olefin monomer; 1~100 parts by weight of an adhesion promoting agent comprising a polybutadiene polymer, which has a molecular weight of 1,000~10,000 and has an anhydride group grafted thereon; 0.1~5 parts by weight of an antioxidant; and 0.5~15 parts by weight of a curative agent.

Another conductor cable in accordance with one embodiment includes a conductor wire; an insulation layer; and an adhesive layer bonding the insulation layer to the conductor wire, wherein the adhesive layer is derived from an adhesive composition comprising: 100 parts by weight of a polyolefin polymer derived from an olefin monomer copolymerized with at least one co-monomer that is different form the olefin monomer, where in the polyolefin polymer comprises an anhydride group grafted thereon; 0.1~5 parts by weight of an antioxidant; and 0.5~15 parts by weight of a curative agent.

Another aspect relates to methods for manufacturing a conductor cable. A method in accordance with one embodiment includes coating an adhesive composition on a conductor wire using an extrusion technique; coating an insulation composition over the coating of the adhesive composition; and vulcanizing the adhesive composition and the insulation composition to produce the insulated conductor cable.

Other aspects and advantages of the of the present application will be apparent from the following description and the appended claims.

DETAILED DESCRIPTION

Embodiments relate to methods and compositions for making insulted conducting cables and cables thus made, such as ESP cables. Specifically, embodiments relate to bonding compositions that can produce excellent bonding between the conductors and the insulation layers. Conductive cables in accordance with embodiments can withstand harsh environments, such as the high temperatures and high pressures encountered in downhole environments.

In accordance with embodiments, the bonding compositions may comprise extrudable, elastomer-based compounds with metal adhesive properties. These compositions may be used as gas-blocking, decompression-resistant, and cross-linkable bonding agents for creating strong bonds between conductors (e.g., ESP cable conductor) and insulation layers. In accordance with some embodiments, the bonding compositions can also be made semi-conductive (e.g., conductivities from $10^{-1}$ to $10^8$ Ohm-cm) to function as cable conductor shields for cables with high power ratings (e.g., >5 kV).

Some embodiments also relate to methods for making such cables using bonding compositions. Some embodiments relate to methods of using cables thus made, particularly in oilfield applications (such as ESP cables).

The bonding compositions according to embodiments may be used to prepare any insulated conductor cables. For clarity of illustration, the following description will use ESP cables as examples. However, one skilled in the art would appreciate that embodiments according to this application are not limited to ESP cables, nor are they limited to oilfield cables. While the bonding compositions can produce better ESP cables that can withstand the harsh environments typically found in wellbores, the better quality conductor cables made in accordance with embodiments can also be used in other applications, not just oilfield applications.

Referring again to FIG. 2A, in a typical ESP cable, an adhesive layer 22 is used to bond the insulation layer 23 to the conductor 21 (or the optional alloy layer 21a). The adhesives are generally made of water-based or solvent-based adhesives, while some cables may have semi-conductive shield layers made of EVA. As noted above, these conventional materials may be degraded with repeated uses under the extreme conditions, such as high temperatures and high pressures, typically found in downhole environments. In addition, any trapped water or solvents from the conventional, liquid-based adhesives are likely to cause the ESP cables to form micro-voids, leading to eventual cable failure. To overcome these problems, embodiments provide new compositions for bonding conductors and insulation layers.

In accordance with embodiments, compositions for bonding conductors and insulation layers may be elastomer-based. These elastomer-based bonding compositions can be applied onto the conductor by any extrusion method known in the art. Once the bonding compositions have been extruded on the conductors, the insulation layers can then be applied. Note that no drying step is necessary because these bonding compositions are not liquid-based. Alternatively, these elastomer-based bonding compositions may be applied simultaneously (or nearly simultaneously) with the insulation layers by using a dual extruder.

Compositions in accordance with embodiments may comprise several components, which may be compounded using any mixer or extruder known in the art, such as blender, two-roll mill, ball mill, Buss kneader, or twin-screw extruder. Any mixing techniques that can provide sufficient shear to thoroughly disperse the ingredients can be used.

In accordance with embodiments, adhesive compositions for bonding conductors and insulation layers may comprise: (1) olefin-based polymer bases (such as ethylene polymers); (2) adhesion promoting components, (3) antioxidants, and (4) curative agents (such as peroxides or other radical initiators). For semi-conductive compositions, an additive that can increase the conductivities of the compositions, such as carbon black powders or carbon nanotubes, may be added to the above compositions. In addition, compositions may optionally comprise one or more of the following: metal oxides, processing aids or oils, cross-linking co-agents, and additives.

The olefin-based (e.g., ethylene) polymers or elastomers may include one or more co-monomers that are different from the base monomers. For example, with ethylene-based polymers, a co-monomer selected from $C_3$-$C_{20}$ alpha olefins may be used. In accordance with some embodiments, the polymers may further include one or more diene co-monomers. Inclusion of diene co-monomers can improve the cross-linking efficiency of the polymers. Suitable diene co-monomers, for example, may include ethylidene norbornene, vinyl norbornene, butadiene, pentadiene, or dicyclopentadiene, to name a few. These compounds are readily available from commercial sources or can be prepared according to methods well known in the art.

Examples of ethylene-based polymers include ethylene propylene (EPM), ethylene propylene diene (EPDM), ethylene alkenes (EAM) such as ethylene octene, ethylene hexene, and ethylene butane, or any combinations of ethylene-based compounds. Combining one or more different base polymers with different chemical compositions to achieve tailored physical properties and processing capabilities is commonly done and is well known to those skilled in the art.

The use of carbon black or other conductive additives in elastomer or polymer composites is also well known to those skilled in the art. Carbon black can improve the conductive properties of the composites. For example, high purity carbon blacks are commonly used to improve the properties of products used in electrical shields. In accordance with some embodiments, the bonding compositions may include carbon blacks or other conductive additives (e.g., carbon nanotubes or metal powders), especially for use with cables intended to transmit higher voltages. To fine tune the desired resistivity, physical properties, or processing characteristics of the materials, any number of different grades of carbon blacks or other conductive additives may be combined. One skilled in the art would appreciate that any conductive additives for use with composites may be used in compositions according to this application.

The carbon black powders used preferably have minimal impurities in order to prevent local electrical stresses, which may initiate electrical discharges and lead to premature cable failure. For example, to help ensure long product life, carbon blacks having the following characteristics are preferred: <0.5% ash (ASTM D-1506), a total extractable ion content (including Na, Si, Ca, Al, K, Cr, Mg, Ni, V, Zn, Ba, Fe, Sr, and other ions) of <300 ppm (CTM EX-AN2), a surface area (measured by nitrogen absorption) of 8~30 $m^2$/g, and a structure having an oil absorption number (OAN) in the range of 50~200, as measured by dibutyl phthalate oil absorption in accordance with ASTM D3493-07.

Addition of carbon blacks is desirable for semiconductive compositions for high voltage applications. For low voltage applications (under 5 kV), the conductive grade carbon black may be omitted or replaced with inorganic fillers such as kaolin clays (calcined, treated, or untreated) barium sulfate, calcium carbonate, or other semi- or non-reinforcing white fillers. For optimum high temperature stability and electrical properties, calcined kaolin clay may be used. In addition, the calcined kaolin clay may be modified with a silane surface treatment either during or prior to the mixing cycle to further improve its property. While any and all grades of mineral fillers may be used separately or in combination, better results may contain surface treated calcined clays of the smallest particle size.

The adhesion promoting component in accordance with embodiments are those that can promote the adhesion of the composition to the conductor. The adhesion promoting components, for example, may contain double bonds that can cross-linked with the ethylene base polymers/elastomers and/or other groups that can bind to the metal conductors. For example, a suitable adhesion promoting component may include a low molecular weight (1,000~10,000) polybutadiene polymer with a high vinyl content of double bonds (1,2-polybutadiene >30%) and 5%~40% maleic anhydride groups grafted (or co-polymerized) into the polybutadiene polymers. The grafted maleic anhydride groups may allow the compounds to bond to metal conductors or other polar surfaces, while the high percentage of 1,2-polybutadiene pendant double bonds may provide active sites for crosslinking to the polyolefin matrix of the insulation.

Upon vulcanization, the high vinyl content ensures that the polybutadiene (of the adhesive compositions) is chemically crosslinked into the polyolefin matrix (of the insulation) by forming permanent bonds from the base polymer (of the adhesive compositions) to the substrate of the insulation, and thus preventing the migration of polar molecules in electric fields. The presence of the mateic anhydride (or other anhydride groups) may allow for the formation of highly thermally stable bonds with polar substrates, such as metal conductors, and with any other polar substrates. The advantages of using a maleic anhydride (or other anhydride) adhesive system in accordance with embodiments, as opposed to the water-based or solvent-based adhesive systems described above, include enhanced thermal stability of the bonding and lack of undesirable degradation byproducts. Other crosslink promoting compounds that may be used in compositions may include molecules that include other anhydrides (e.g., succinic anhydride,) and double bonds in the same molecules.

In accordance with some embodiments, the adhesion promoting components may be integral part of the base polymer molecules. That is, the base polyolefin polymers for use in adhesive compositions may be modified by having anhydride groups (e.g., maleic anhydride) grafted thereon. This alternative approach eliminates the need to crosslink the adhesion promoting components into the base polymer compound (e.g., using the 1,2-polybutadiene described above) because the required functional groups are grafted (bonded) directly to the base polymer backbone. To ensure good crosslink density and bonding between the shield and the insulation layer, crosslinking co-agents may be optionally added in this case.

To increase product lifetime, especially for long-term exposure to high temperatures, an antioxidant, e.g., polymerized 1,2-dihyro-2,2,4-trimethylquinoline (trade name Agerite Resin D™, from Emerald Performance Materials, LLC, Cuyahoga Falls, Ohio, U.S.A.), may be added to the compositions. The use of such antioxidants in polymer compositions is well known in the art. Other suitable antioxidants know in the art may also be used.

Curative agents for use with compositions according to embodiments may be based on an organic peroxide compound. Organic peroxides would decompose when subjected to high temperature to form free radicals. The free radicals can subsequently initiate chemical grafting (polymerization) of the components in the adhesive compositions according to embodiments, leading to the formation of crosslinked composites. Examples of peroxides useful for this purpose include dicumyl peroxide, di-(2-tert-butylperoxyisopropyl)-benzene, t-butyl cumyl peroxide, 2,5-dimethyl-2,5-di-(t-butylperoxy)-hexane, and others known in the art. Other radical initiators that are known in the art may also be used with embodiments, such as azo compounds (such as AIBN, azobisisofutyronitrile) or halogen molecules.

Optionally, adhesive compositions may contain metal oxides to enhance their long term heat stability. This practice is well known to those skilled in the art. Suitable metal oxides, for example, may include, but are not limited to, zinc oxide, lead oxides, iron oxides, or any combination of these compounds and others. In accordance with embodiments, it is preferable that the metal oxides used are clean and easily dispersible (mixable) in the compositions. For example, it may be advantageous to pre-mix the metal oxides with an ethylene base polymer (or other polymers) to form a pre-mix that can be more evenly dispersed in the adhesive compositions.

To enhance processability of adhesive compositions according to this application, the compositions may optionally contain processing aids or oils, such as hydrocarbon wax, process oil, low density polyethylene, fatty acid or stearate type chemicals, or other additives well known to those skilled in the art.

In accordance with embodiments, the crosslink density of the composition may be adjusted to enhance interlayer crosslinking or to achieve greater crosslink density. For this purpose, crosslinking co-agents, which contain multiple crosslinking groups in the same molecules, may be added to adhesive compositions. Commonly used crosslinking co-agents, for example, include triallyl cyanurate (TAC), triallyl isocyanurate (TAIC), 1,2-polybutadiene resins, or other compounds known to those skilled in the art.

In accordance with some embodiments, other additives may also be mixed into adhesive compositions to enhance or change material properties or reduce costs. Such additives, for example, include coupling agents, ultraviolet absorbers or stabilizers, ozone absorbers or stabilizers, antistatic agents, pigments, lubricants, surfactants, extenders oils, inorganic fillers, reinforcing fillers, flame retardants, antistatic agents, nucleating agents, tackifiers, viscosity control agents, smoke suppressants, crosslinking boosters and catalysts, scorch protectors, and metal deactivators. These additives are typically used in a range from 0.1 to 250 parts (relative to 100 parts by weight of the ethylene based polymers) in the final compositions.

Figure 3:
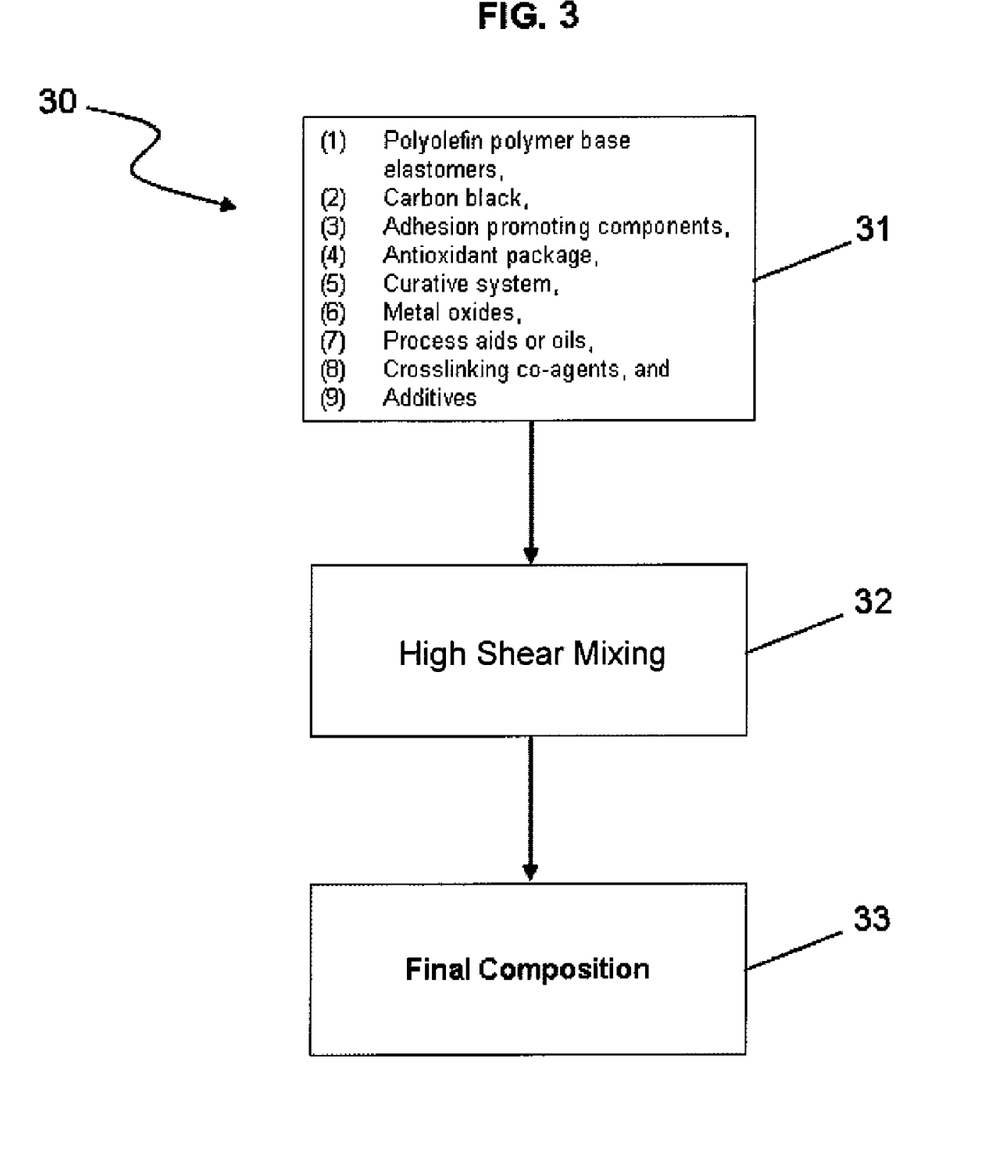
FIG. 3 shows a method of making an adhesive composition in accordance with one embodiment.

Some embodiments relate to methods for making adhesive compositions. FIG. 3 shows a flow chart illustrating one such method 30 for making an adhesive composition 33 to be used to form bonding between conductors and insulators of electric cables, e.g., ESP cables. Some or all of the ingredients (such as those shown in 31) may be mixed using any suitable mixing technique (such as high shear mixing techniques) using an appropriate equipment (step 32). An exemplary equipment for efficient mixing of the components may be an internal mixer (commonly known as a Banbury mixer). However, sufficient mixing may also be achieved using other mixing techniques or equipment, such as a twin screw extruder, two-roller mill, Buss kneader, or other mixing techniques capable of generating enough shear to provide good dispersive and distributive mixing of the components.

Figure 4:
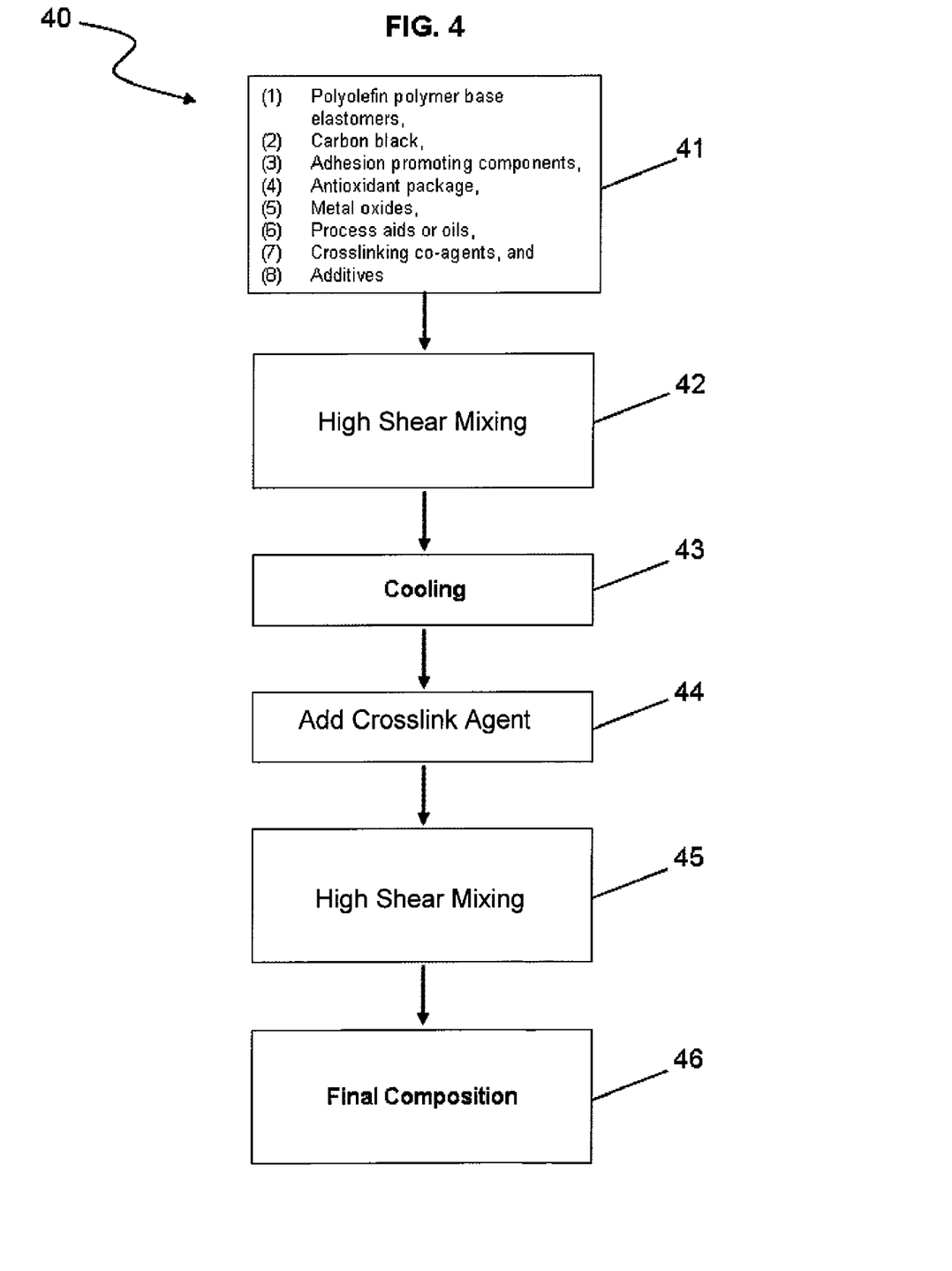
FIG. 4 shows a method of making an adhesive composition in accordance with another embodiment.

FIG. 4 shows a flow chart illustrating another method 40 for making an adhesive composition 46, which may be used to form bonding between conductors and insulators of electric cables, e.g., ESP cables. As shown in FIG. 4, method 40 may employ multiple mixing steps to improve dispersion and distribution of the components in the compositions. For example, some or all of the ingredients shown in 41, without the curative agent (e.g., peroxide), may be mixed using a high shear mixing technique or any other suitable mixing technique (step 42). The resultant mixture is allowed to cool (step 43). Then, the mixture is mixed with the curative (or crosslinking) agent 44, again using a high shear mixing technique or any suitable mixing technique (e.g., using a two-roller mill) (step 45). In this process, the crosslinking (curative) agent 44 (e.g., peroxides) may be blended into the final composition 46. The two-step process illustrated in FIG. 4 may allow for the first step to be performed at higher temperatures than would be possible if the peroxide is present in the mixture. The two-step process shown in FIG. 4 is for illustration only. One of ordinary skill in the art would appreciate that the number of mixing steps may be as many as needed in order to achieve the desired properties.

Once compounded, the adhesive compositions may be used to prepare electrical cables (e.g., ESP cables) using any suitable methods known in the art, including co-extrusion or single extrusion, followed by vulcanization. The extrusion and vulcanization techniques are well known to those skilled in the art.

Some embodiments relate to methods for making electrical conductor cables.

Figure 5:
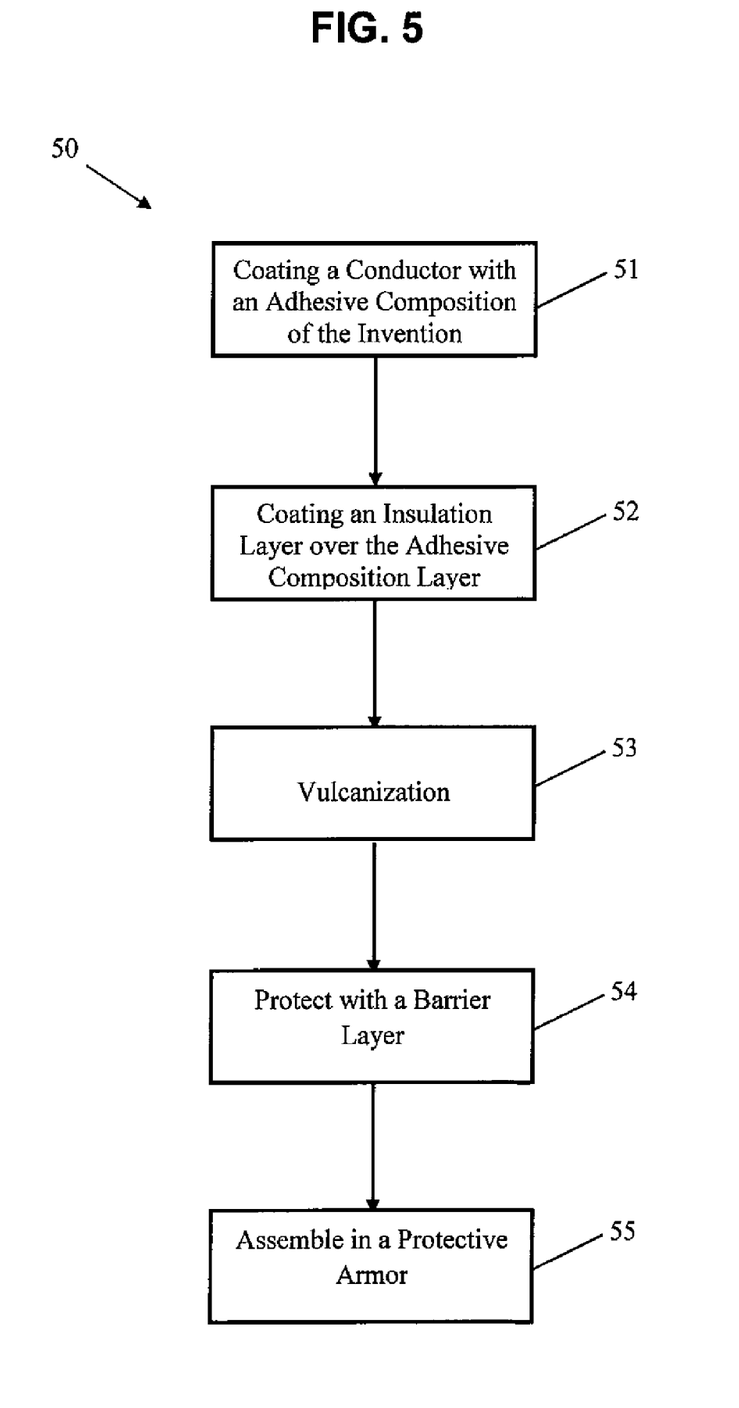
FIG. 5 shows a flow chart illustrating a method for manufacturing a conductor cable in accordance with one embodiment.

FIG. 5 shows a flowchart illustrating a method in accordance with one embodiment. As shown in FIG. 5, a method 50 for making a conductive cable (shown as 20 in FIG. 2A) comprises the step of coating an adhesive composition (see Examples 1-3 below) on a conductive wire (shown as 21 in FIG. 2A) to form an adhesive layer (shown as 22 in FIG. 2A) (step 51). The coating may be accomplished using any suitable techniques, including conventional extrusion techniques. As noted above, an optional coating of a metal alloy (shown as 21a in FIG. 2A) may be applied on the conductor to act as a barrier of $H_2S$ before coating the adhesive composition. Then, an insulation layer (shown as 23 in FIG. 2A) may be coated over the adhesive layer (step 52). Again, the coating of the insulation layer may be accomplished with any suitable methods, including extrusion techniques. Once the adhesive layer and the insulation layer are in place, the coated conductive wire assembly may be subjected to vulcanization to trigger the crosslinking and permanent bonding between the conductive wire, adhesive layer, and the insulation layer (step 53).

The conductive cables as prepared from step 53 may be optionally protected with one or more barrier layers (shown as 24 in FIG. 2A) (step 54). As noted above, the barrier layer may be made of a fluoropolymer or some resistant polymer/materials to protect the cable from the hash environments. Finally, the conductive cables, together with other cables or conduits, may be assembled into a metal (or alloy) armor to furnish the desired cables, such as an ESP cable.

Note that the steps in FIG. 5 are described in sequential manner for clarity. One skilled in the art would appreciate that some of these steps may be performed simultaneously or substantially simultaneously. For example, the coating (extrusion) of the adhesive layer and the insulation layer may be applied substantially simultaneous, because there is no need to wait for solvent or water to dry from the adhesive compositions. Similarly, the vulcanization process may be applied immediately (i.e., substantially simultaneously) after the layers are applied. Accordingly, such modifications and variations do not depart from the scope of the present application.

Embodiments may be further illustrated with the following specific examples.

EXAMPLE 1

An exemplary composition in accordance with one embodiment may contain the following ingredients. The relative proportions described below are relative to the ethylene polymer, which is assigned as 100 parts in the composition. These ingredients may be thoroughly mixed to obtain final compositions for use as adhesives for producing strong bondings between conductors and insulators of electric cables, e.g., ESP cables. The components of this particular exemplary composition include:

(a) 100 parts of an ethylene polymer, polymerized with at least one comonomer selected from the group consisting of $C_3$~$C_{20}$ alpha olefins and optionally with another co-monomer having a diene (i.e., two or more double bonds in a molecule) for improved crosslinking efficiency. The diene-containing co-polymer, for example, may be ethylidene norbornene, vinyl norbornene, or dicyclopentadiene.

(b) 10~300 parts of an electrical grade carbon black. The carbon black preferably has minimal impurities and <0.1% ash (ASTM D-1506), a total extractable ion content of <150 ppm (CTM EX-AN2), a surface area (measured by nitrogen absorption) of 8~130 $m^2/g$, and a structure having an oil absorption number from 50 to 200 (measured by dibutyl phthalate oil absorption; ASTM D3493-07), (c) 1~100 parts of an adhesion promoting additive consisting of a polybutadiene polymer with 20%~90% vinyl double bonds, a molecular weight of approximately 1,000~10,000; and 5%~40% grafted maleic anhydride, (d) 0.1~5 parts of an antioxidant, (e) 0.5~15 parts of an organic peroxide crosslinking agent, (f) Optionally, 1~30 parts each of metal oxides for improved aging. The metal oxides, for example, may be zinc oxide, iron oxides, or lead oxides, (g) Optionally, 0.5~20 parts of a crosslinking co-agent, which acts to increase crosslink density, (h) Optionally, 0.1~20 parts of a plasticizer or processing aid, and (i) Optionally, 0.1~250 parts of other typical composite additives known to those experienced in the art.

EXAMPLE 2

An alternative composition in accordance with another embodiment may comprise similar components as described in EXAMPLE 1, except that the base polymer or elastomer (a) and the adhesion promoting additive (c) may be substituted by a polyolefin having anhydride groups (e.g., maleic anhydride) grafted thereon. The anhydride group may account for about 0.1~20% of the polymer.

EXAMPLE 3

Another example of a composition is for low kV rated cables (under 5 kV), wherein the semi-conductive property of the adhesive layer is not necessary. Therefore, the carbon black (b) in EXAMPLE 1 may be omitted or replaced with any number of inorganic or mineral fillers in an amount ranging from 30 to 250 parts. Examples of inorganic or mineral fillers include, but are not limited to, precipitated or fumed silica, water washed clays, calcined clays, treated clays, ground or precipitated calcium carbonate, titanium dioxide, or similar materials known to those experienced in the art. In accordance with some embodiments, 1~20 parts of a silane coupling agent may also be added to enhance the filler compatibility with the polymer matrix.

The above examples are for illustration only. One skilled in the art would appreciate that modification and variations of these compositions are possible without departing from the present application. For example, even though the curative agents in the above examples are peroxides, other radical initiator curative agents may also be used, such as azo compounds (e.g., AIBN, azobisisobutyronitrile) or halogen molecules.

Advantages of embodiments described in the present application may include one or more of the following. An adhesive composition is not liquid-based and will not have problems associated with trapped solvent commonly found in the prior art approach. Adhesion compositions can have enhanced abilities to promote adhesion between the insulation layers and the conductors.

While embodiments have been described herein, those skilled in the art, having benefit of this disclosure, will appreciate that other embodiments can be devised which do not depart from the scope of the present application. Accordingly, the scope of the subject matter to be protected at this time is limited only by the attached claims.

What is claimed is:

1. An adhesive composition, comprising:
   100 parts by weight of a polyolefin polymer derived from an olefin monomer copolymerized with at least one co-monomer that is different form the olefin monomer;
   1~100 parts by weight of an adhesion promoting agent comprising a polybutadiene polymer, which has a molecular weight of 1,000~10,000 and has an anhydride group grafted thereon;
   0.1~5 parts by weight of an antioxidant; and
   0.5~15 parts by weight of a curative agent.

2. The adhesive composition of claim 1, wherein the olefin monomer that forms the polyolefin polymer is ethylene.

3. The adhesive composition of claim 1, wherein the curative agent is an organic peroxide.

4. The adhesive composition of claim 3, wherein the organic peroxide is selected from the group consisting of dicumyl peroxide, di(2-tert-butylperoxyisopropyl) benzene, t-butyl cumyl peroxide, 2,5-dimethyl-2,5-di(t-butylperoxy) hexane, and a combination thereof.

5. The adhesive composition of claim 1, wherein the butadiene polymer has a double bond content of at least 30% and the anhydride group content of 5%~40%.

6. The adhesive composition of claim 1, wherein the co-monomer is selected from the group consisting of $C_3$~$C_{20}$ alpha olefins.

7. The adhesive composition of claim 6, wherein the at least one co-monomer comprises two co-monomers, one of which is selected from the group consisting of $C_3$~$C_{20}$ alpha olefins and the other is a diene compound.

8. The adhesive composition of claim 7, wherein the diene compound is selected from the group consisting of ethylidene norbornene, vinyl norbornene, and dicyclopentadiene.

9. The adhesive composition of claim 1, further comprising 10~300 parts by weight of carbon black.

10. The adhesive composition of claim 1, further comprising 1~30 parts by weight of a metal oxide selected from the group consisting of zinc oxide, lead oxides, iron oxides, and a combination thereof.

11. The adhesive composition of claim 1, further comprising 0.1~20 parts by weight of a processing aid selected from the group consisting of hydrocarbon wax, process oil, low density polyethylene, fatty acid, and a combination thereof.

12. The adhesive composition of claim 1, further comprising 0.5~20 parts by weight of a crosslinking co-agent selected from the group consisting of triallyl-cyanurate (TAC), triallyl-isocyanurate (TAIC), (1,2)-polybutadiene resins, and a combination thereof.

13. The adhesive composition of claim 1, further comprising 0.1~250 parts by weight of an additive selected from a coupling agent, an ultraviolet absorber or a stabilizer, an ozone absorber or stabilizer, an antistatic agent, a pigment, a lubricant, a surfactant, an extender oil, an inorganic filler, a reinforcing filler, a flame retardant, an antistatic agent, a nucleating agent, a tackifier, a viscosity control agent, a smoke suppressant, a crosslinking booster, a scorch protector, a metal deactivator, and a combination thereof.

14. The adhesive composition of claim 1, further comprising an inorganic filler selected from the group consisting of untreated kaolin clay, calcined kaolin clay, treated kaolin clay, barium sulfate, and calcium carbonate.

15. The adhesive composition of claim 14, wherein the inorganic filler is calcined kaolin clay.

16. The composition of claim 15, wherein the calcinated kaolin clay is modified with a silane surface treatment.

17. The adhesive composition of claim 1, wherein the polyolefin polymer further comprising a co-monomer with a diene selected from the group consisting of ethylidene norbornene, vinyl norbornene, and dicyclopentadiene.

18. A conductor cable, comprising:
    a conductor wire;
    an insulation layer; and
    an adhesive layer bonding the insulation layer to the conductor wire, wherein the adhesive layer is derived from an adhesive composition comprising:
       100 parts by weight of a polyolefin polymer derived from an olefin monomer copolymerized with at least one co-monomer that is different form the olefin monomer;
       1~100 parts by weight of an adhesion promoting agent comprising a polybutadiene polymer, which has a molecular weight of 1,000~10,000 and has an anhydride group grafted thereon;
       0.1~5 parts by weight of an antioxidant; and
       0.5~15 parts by weight of a curative agent.

* * * * *